March 11, 1952 H. L. ELLIOTT 2,588,709
DISK HARROW
Filed June 6, 1947 3 Sheets-Sheet 2
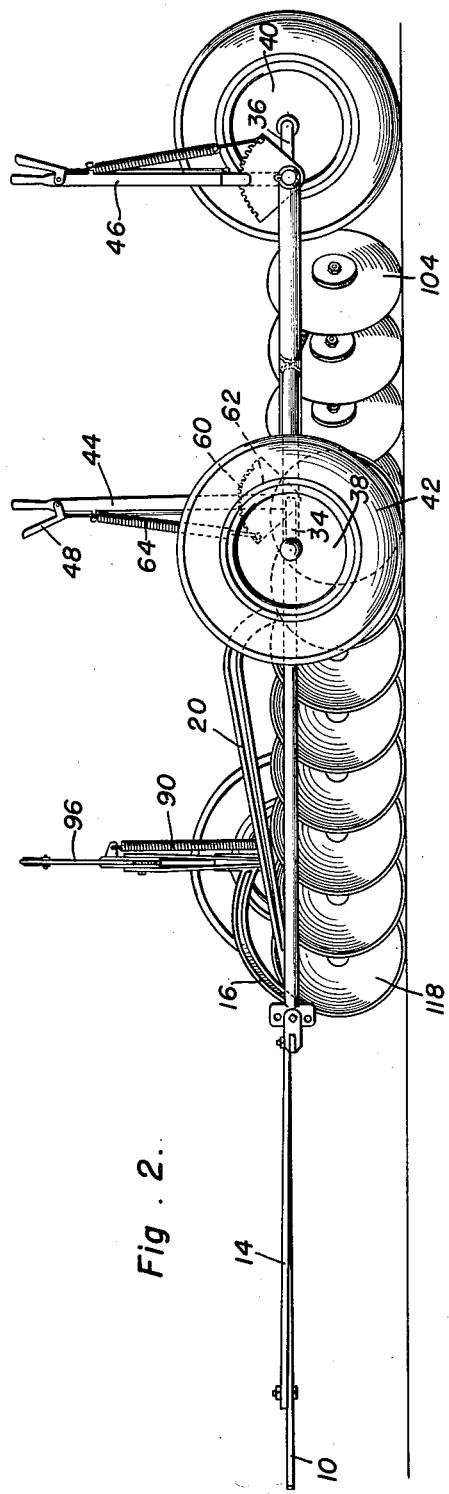
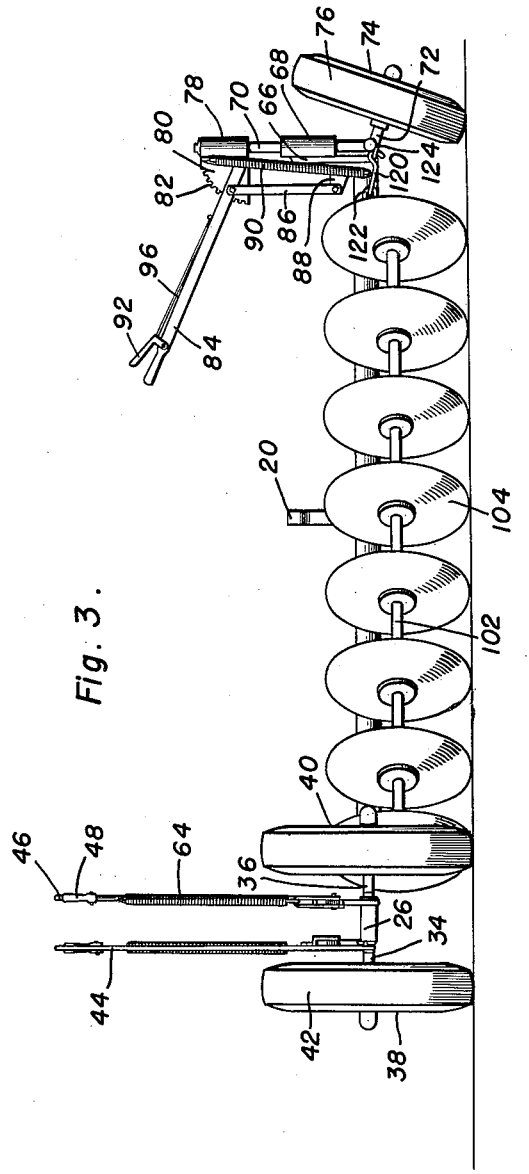
Inventor
Hubert Lee Elliott March 11, 1952     H. L. ELLIOTT     2,588,709
DISK HARROW Filed June 6, 1947

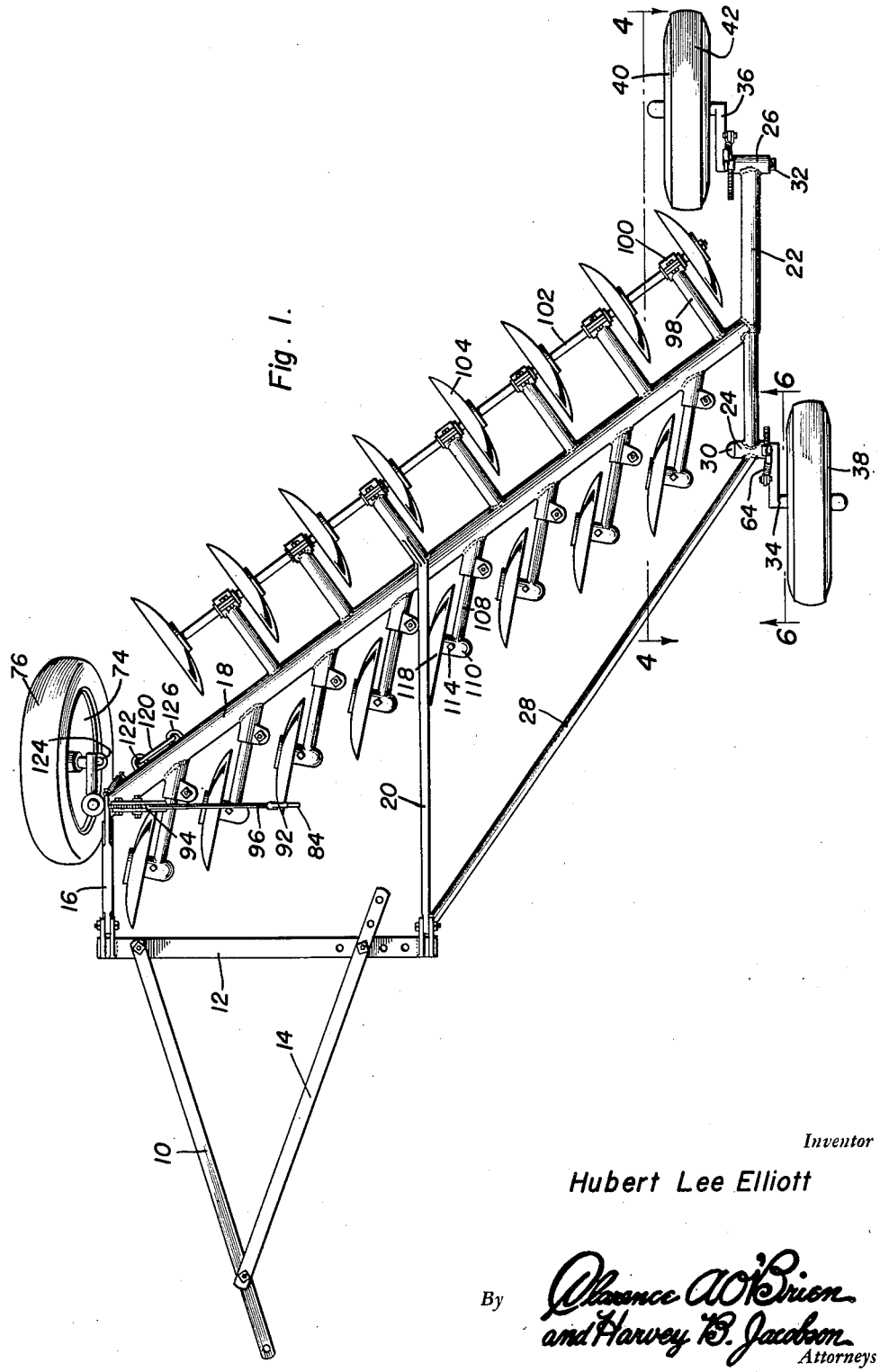

Inventor
Hubert Lee Elliott

Patented Mar. 11, 1952

2,588,709

UNITED STATES PATENT OFFICE 2,588,709

DISK HARROW

Hubert Lee Elliott, Aline, Okla.

Application June 6, 1947, Serial No. 752,977

1 Claim. (Cl. 55—73)

This invention relates to new and useful improvements in diskers and the primary object of the present invention is to provide a farm implement to be used on plowed or unplowed land to provide smooth furrows and leave a slight ridge preventing soil erosion therebetween.

Another important object of the present invention is to provide a wheeled frame including a beam supporting gangs of discs that are removable from the beam for sharpening or replacement.

A further object of the present invention is to provide a device of the character referred including novel means for raising and lowering the frame for disposition of the discs to the ground surface.

A still further aim of the present invention is to provide a disker of the character referred to that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention;

Figure 2 is a side elevational view of Figure 1;

Figure 3 is a rear elevational view of Figure 1;

Figure 4:
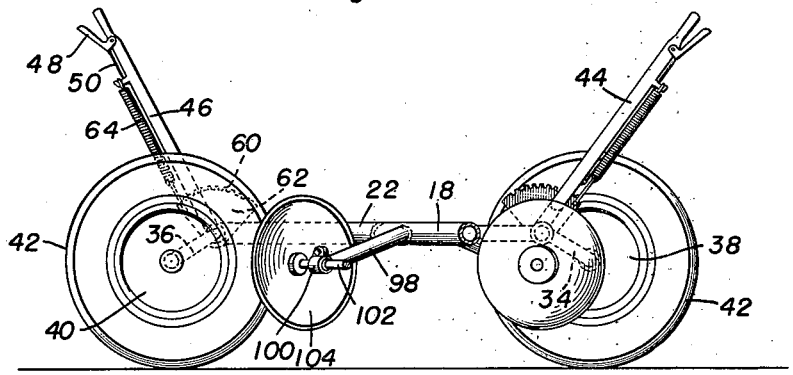
Figure 4 is a vertical longitudinal sectional view taken on line 4—4 of Figure 1.
Figure 5:
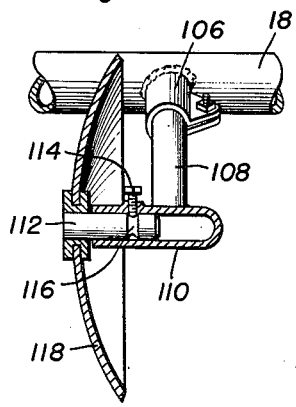
Figure 5 is an enlarged fragmentary view showing the manner in which the forward gang of discs are attached to the beam, with parts of the beam and discs broken away and shown in section; and, Figure 6 is an enlarged longitudinal vertical sectional view taken on line 6—6 of Figure 1.
Figure 6:
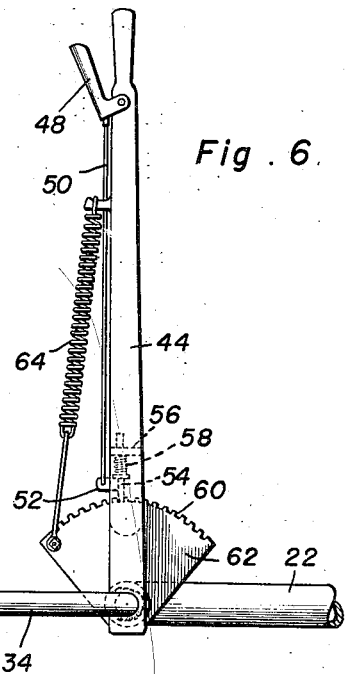

Referring now to the drawings in detail, wherein for the purpose of illustration, there is shown a preferred embodiment of the present invention, the numeral 10 represents an elongated bar which is suitably attached at one end to a tractor or the like (not shown). The other end of the bar 10 is detachably secured to one end of a transversely extending bar 12. A connecting bar 14 is removably secured at one end to the bar 10 and the other end of bar 14 is removably and adjustably connected to the other end of bar 12.

Pivotally and removably secured to the terminal portion of bar 12 is a longitudinal arcuate brace 16 suitably carried by one of the a beam 18.

Removably and pivotally carried by the other end of bar 12 is a second longitudinal arcuate brace 20 that is suitably secured to substantially the center of beam 18. At one end of beam 18 is a longitudinal side member 22 carrying spaced parallel horizontal hubs 24 and 26 at its terminal portions. Secured to one end of hub 24 is a brace 28, that is removably carried by the forward end of brace 20, for bracing side member 22 to the bar 12.

Journaled in hubs 24 and 26 rsepectively are the crank arms 30 and 32 of a pair of oppositely turned crank axles 34 and 36. The other arms of the crank axles journally receive a pair of wheels 38 and 40 having preferably pneumatic or hard rubber tires 42. Pivotally secured to crank axles 34 and 36 are upstanding handles or levers 44 and 46, each having a pivotal hand grip 48. The hand grips 48 are connected to ears 52 projecting outwardly from locking pins 54 by pitmans or rods 50. Pins 54 normally project downwardly from and are slidably guided by plates 56 carried by the levers to engage segmental plates 62 secured to the hubs 24 and 26, due to urging from springs 58. The plates 62 include upper curved edges having notches 60 therein for selectively receiving the pins 54.

Coil spring 64 connects the handles to the plates 62 for normally yieldingly holding the handles at one end of the plates 62.

Carried at the end of beam 18 opposite from member 22, is a frame 66 supporting a sleeve 68, that receives a vertically adjustable shaft 70. At the lower end of shaft 70 is suitably secured a downwardly inclined axle 72 on which is journaled a wheel 74 having a preferably pneumatic tire 76. This wheel is adapted to be tilted at all times due to the inclination of the axle 72, which is at an angle with shaft 70, the angle preferably being 75 degrees. Detachably secured at the upper end of shaft 70 is a sleeve 78, open at its lower end to fit over the shaft 70. Projecting outwardly from sleeve 78 is a sector plate 80 having notches 82 formed in its upper edge. A handle or lever 84 is pivotally secured to plate 80 and handle 84 is pivotally connected by bars 86 to an ear 88 projecting outwardly from frame 66.

A removable coil spring 90 connecting sleeve 78 to beam 18, normally retains sleeve 78 against sleeve 68.

Pivoted to handle 84 is a hand grip 92 that is connected to a spring actuated locking pin 94, by rod 96. Pin 94 is adapted to selectively engage notches in plate 80, for vertical adjustment of shaft 70, in sleeve 68.

As best seen in Figure 1 of the drawings, beam 18 is disposed at an oblique angle with the axis of the wheels, on a plurality of inclined outwardly extending parallel spaced arms 98, suitably carried by one side of said beam.

At the outer ends of arms 98 are journaled bearings 100, adapted to receive a shaft 102, the axis of which is parallel to the axis of beam 18. A gang of trailing discs 104 are removably carried by shaft 102 to rotate with the shaft.

An adjustable clamp member 106 carried by the other side of beam 18, adjustably receives spaced parallel arms 108 which extend outwardly and downwardly at a slight angle with the beam. At the terminal portions of arms 108 are sleeves 110 closed at one end and adapted to removably receive hubs 112 which are journaled in sleeve 110. Set screws 114 carried by sleeves 110 engage a recess 116 in the hub to prevent longitudinal movement of the hub relative to the sleeve. A gang of leading discs 118 are carried by these hubs 112.

The leading discs 118 are in echelon form preferably at an angle of 17½ degrees with the line of movement of the device, and the trailing gang of discs 104 are also in echeloned formation at preferably an angle of 35 degrees with the line of movement of the said disker.

The leading discs and trailing discs are arranged to work in pairs by inclining the discs of each pair in an opposite direction, whereby in traveling over the previously plowed ground, a slight ridge is formed to reduce erosion from both wind and rain.

By adjusting handles 44 and 46, it is possible to raise or lower the respective gangs of discs 104 and 118 toward the ground surface.

To prevent vertical twisting of wheel 74 and rotation of shaft 70, there is provided a hook 120 pivoted as at 122 to beam 18, and adapted to engage an eye 124 carried by axle 72. This hook normally engages an eye 126 carried by the beam when not in use.

One of the greatest advantages of this implement, is the elimination of all side draft which usually effects the efficiency of conventional type wheat land disc plows now in use. The unique arrangement of the leading discs with respect to the trailing discs, namely, the staggered arrangement of the discs, permits the respective gangs of discs to cut in an opposite direction thus balancing all side draft, resulting in a much lighter draft than any conventional type disc plow will afford.

Obviously, by reducing the draft, only a small size tractor will be necessary to pull the tractor efficiently over the desired terrain.

The disker thus described is applicable for any type of terrain under all soil conditions without necessary adjustments to the device.

It has been found that when using the disker on an extremely hard or dry soil, the efficiency of the same will be increased with the addition of a weight box (not shown) supported on the beam. This weight box may be of any suitable type, but it is preferred that the same be of trough form so that the weighted matter may be quickly and readily placed therein or removed therefrom.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

In an agricultural implement including a wheeled frame having a diagonal beam; a plurality of arms projecting laterally from said beam, bearings carried by said arms, a shaft journaled for rotation in said bearings, a set of trailing disks carried by said shaft, a plurality of clamping members fixed to said beam and staggered with respect to said arms, bars adjustable longitudinally in said clamping members and inclined to said beam, sleeves fixed to said bars, a plurality of leading disks having hub portions received in said sleeves, and means carried by said sleeves for retaining the hub portions relative thereto.

HUBERT LEE ELLIOTT.

REFERENCES CITED

The following references are of record in the file of this patent:

UNITED STATES PATENTS

| Number | Name | Date |
| --- | --- | --- |
| 759,782 | Ward et al. | May 10, 1904 |
| 1,172,046 | Psencik | Feb. 15, 1916 |
| 1,861,667 | Seaholm | June 7, 1932 |
| 1,892,199 | Altgelt et al. | Dec. 27, 1932 |
| 1,898,870 | Domries et al. | Feb. 21, 1933 |
| 2,184,438 | Scarlett | Dec. 26, 1939 |
| 2,352,963 | McMahon | July 4, 1944 |
| 2,380,323 | Morkoski | July 10, 1945 |
| 2,420,437 | McMahon | May 13, 1947 |